United States Patent
Bobbitt et al.

(10) Patent No.: US 7,962,365 B2
(45) Date of Patent: Jun. 14, 2011

(54) USING DETAILED PROCESS INFORMATION AT A POINT OF SALE

(75) Inventors: Russell Patrick Bobbitt, Pleasantville, NY (US); Quanfu Fan, Somerville, MA (US); Arun Hampapur, Norwalk, CT (US); Frederik Kjeldsen, Poughkeepsie, NY (US); Sharathchandra Umapathirao Pankanti, Darien, CT (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 12/262,458

(22) Filed: Oct. 31, 2008

(65) Prior Publication Data
US 2010/0114623 A1    May 6, 2010

(51) Int. Cl.
G06Q 20/00 (2006.01)
G06F 17/00 (2006.01)
(52) U.S. Cl. .................................... 705/16; 235/375
(58) Field of Classification Search .................. 235/375
See application file for complete search history.

(56) References Cited

U.S. PATENT DOCUMENTS

| | | |
|---|---|---|
| 4,991,008 A | 2/1991 | Nama |
| 5,748,085 A | 5/1998 | Davis et al. |
| 5,920,338 A | 7/1999 | Katz |
| 5,965,861 A | 10/1999 | Addy et al. |
| 6,075,560 A | 6/2000 | Katz |
| 6,236,736 B1 | 5/2001 | Crabtree et al. |
| 6,793,128 B2 | 9/2004 | Huffman |
| 6,847,393 B2 | 1/2005 | Ashe et al. |
| 6,998,987 B2 | 2/2006 | Lin |
| 2004/0064372 A1 | 4/2004 | Freeny, Jr. |
| 2005/0146605 A1 | 7/2005 | Lipton et al. |
| 2005/0162515 A1 | 7/2005 | Venetianer et al. |
| 2007/0043608 A1 | 2/2007 | May et al. |
| 2007/0272734 A1 * | 11/2007 | Lipton et al. ................. 235/375 |
| 2008/0100704 A1 | 5/2008 | Venetianer et al. |
| 2008/0122926 A1 | 5/2008 | Zhou et al. |
| 2008/0198225 A1 | 8/2008 | Gal et al. |

FOREIGN PATENT DOCUMENTS

| | | |
|---|---|---|
| WO | WO 2006/105376 | 10/2006 |
| WO | WO 2008/008505 | 1/2008 |
| WO | WO 2008/083869 A1 | 7/2008 |

* cited by examiner

Primary Examiner — F. Ryan Zeender
Assistant Examiner — Denisse Ortiz Roman
(74) Attorney, Agent, or Firm — Ryan, Mason & Lewis, LLP

(57) ABSTRACT

Techniques for using transactional and visual event information to facilitate loss prevention are provided. The techniques include obtaining video of one or more visual events at a point of sale environment and one or more transaction log entries that correspond to the video, wherein the one or more transaction log entries comprise one or more transactional events, categorizing each event as one of one or more model events, using each categorized event to create a revised transaction log, wherein the revised transaction log comprises a sequence of categorized events, wherein each categorized event is a combination of the one or more transactional events and the one or more visual events, examining the revised transaction log to correct one or more mis-categorizations, if any, and revise one or more model event categories with the one or more corrected mis-categorizations, if any, and using the revised transaction log to facilitate loss prevention.

23 Claims, 6 Drawing Sheets

USING DETAILED PROCESS INFORMATION AT A POINT OF SALE

CROSS-REFERENCE TO RELATED APPLICATIONS

The present application is related to U.S. patent application entitled "Generating an Alert Based on Absence of a Given Person in a Transaction," identified by Ser. No. 12/262,454, and filed concurrently herewith, the disclosure of which is incorporated by reference herein in its entirety.

Additionally, the present application is related to U.S. patent application entitled "Calibrating Regions of Interest for Video Surveillance," identified by Ser. No. 12/262,446, and filed concurrently herewith, the disclosure of which is incorporated by reference herein in its entirety.

The present application is also related to U.S. patent application entitled "Creating a Training Tool," identified by Ser. No. 12/262,467 and filed concurrently herewith, the disclosure of which is incorporated by reference herein in its entirety.

FIELD OF THE INVENTION

The present invention generally relates to information technology, and, more particularly, to retail loss prevention.

BACKGROUND OF THE INVENTION

The detailed information of what exactly happened at checkout (for example, a retail checkout) can be extremely important. Existing approaches, however, generally infer such information by guesswork using a transaction log (TLOG), implementing human oversight at checkout, or implementing human oversight of the video of the checkout.

The TLOG only contains transactional events, and it misses such things as whether or not a customer, cashier and/or manager is present at any given time. A TLOG also misses a fake scan (that is, an item that is moved from the entry to exit area of the lane without being entered into the transaction), whether or not a customer's basket was empty as it left the checkout lane, as well as visual details of checkout events such as products scanned, people in customer/cashier area, etc.

Also, fraud is only committed in a small number of cases, and as the number of lanes to monitor increases, simply examining all of these events becomes disadvantageously time-consuming. Potential fraudulent events such as the above are of clear interest for retailers because they are often direct or indirect indicators of fraud committed by the customer and/or cashier and/or manager.

SUMMARY OF THE INVENTION

Principles of the present invention provide techniques for using detailed process information at a point of sale.

An exemplary method (which may be computer-implemented) for using transactional and visual event information to facilitate loss prevention, according to one aspect of the invention, can include steps of obtaining video of one or more visual events at a point of sale environment and one or more transaction log (TLOG) entries that correspond to the video, wherein the one or more transaction log entries comprise one or more transactional events, categorizing each event as one of one or more model events, using each categorized event to create a revised transaction log, wherein the revised transaction log comprises a sequence of categorized events, wherein each categorized event is a combination of the one or more transactional events and the one or more visual events, examining the revised transaction log to correct one or more mis-categorizations, if any, and revise one or more model event categories with the one or more corrected mis-categorizations, if any, and using the revised TLOG to facilitate loss prevention.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include using detailed process information at a point of sale (for example, a retail checkout) to facilitate retail loss prevention. The techniques described herein use a camera to analyze and understand the anatomy of the checkout process and create a new log that is more informative. For example, one or more embodiments of the invention include using a camera to get a detailed description and timing of checkout events, human supervision of the automated results, as well as revising event categories and event recognizers. One or more embodiments of the invention may also iterate the above-noted steps.

In contrast to the disadvantageous existing approaches noted above, the techniques described herein include enhanced data mining, wherein visual information can provide an additional layer of content on top of TLOG entries (for example, TLOG contains a barcode of a pack of chewing gum, but the item may be classified as a sirloin steak (possible ticket switching occurred)). Additionally, one or more embodiments of the invention include a supplement to data mining, wherein purely visual events which are completely missed by TLOG are captured (for example, a fake scan, a cart not emptied by customer, etc.). Also, the techniques described herein can include reinforcement learning.

Figure 1:
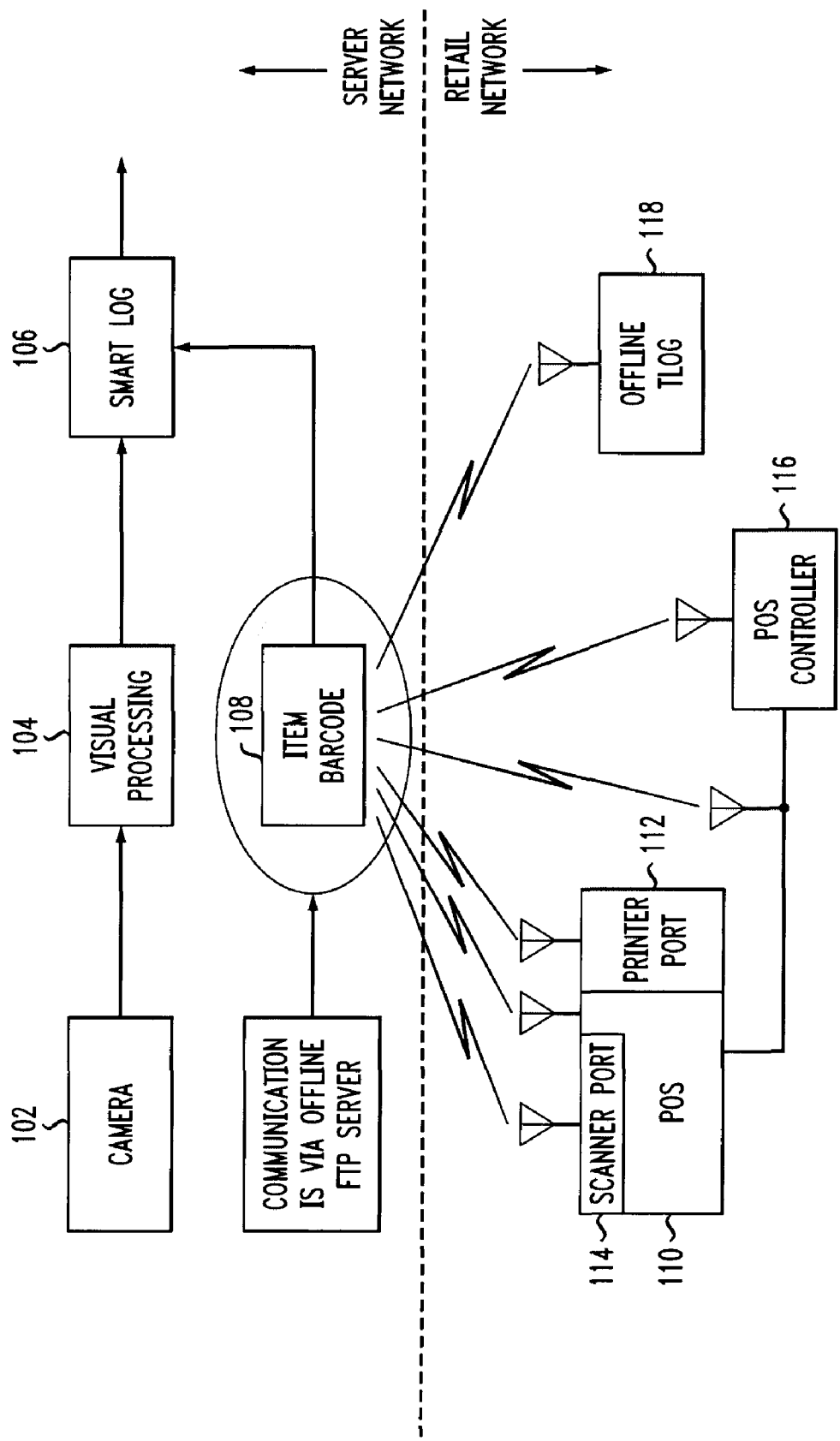
FIG. 1 is a diagram illustrating an exemplary architecture, according to an embodiment of the present invention.

FIG. 1 is a diagram illustrating an exemplary architecture, according to an embodiment of the present invention. By way of illustration, FIG. 1 depicts a server network and a retail network. The server network includes a camera 102, which feeds to visual processing in step 104, which, along with an item barcode 108, leads to a SmartLog 106. Also, item barcodes can be obtained from different points in the retail network such as, for example, getting TLOG from a point-of-sale's (POS's) scanner port 114 and printer port 112, intercepting and extracting TLOG from the network between POS 110 and POS controller 116, and obtaining TLOG from an offline TLOG data repository 118.

Within the context of an ordinary retail checkout environment, a number of processes can occur. For example, a shopper may enter a queue, wait, empty his or her cart/basket, present any pre-transaction material (for example, a loyalty card), scan items, pay for items and leave. Additionally, a cashier may, for example, seek or present identification, wait for the customer to empty his or her cart/basket, load the cash register, unload the cash register, count money, call another cashier, indicate that a lane is active or inactive, call a supervisor, void a transaction and/or item, take payment, seek payment and bag items for a customer. Further, a supervisor may, for example, override a situation.

Figure 2:
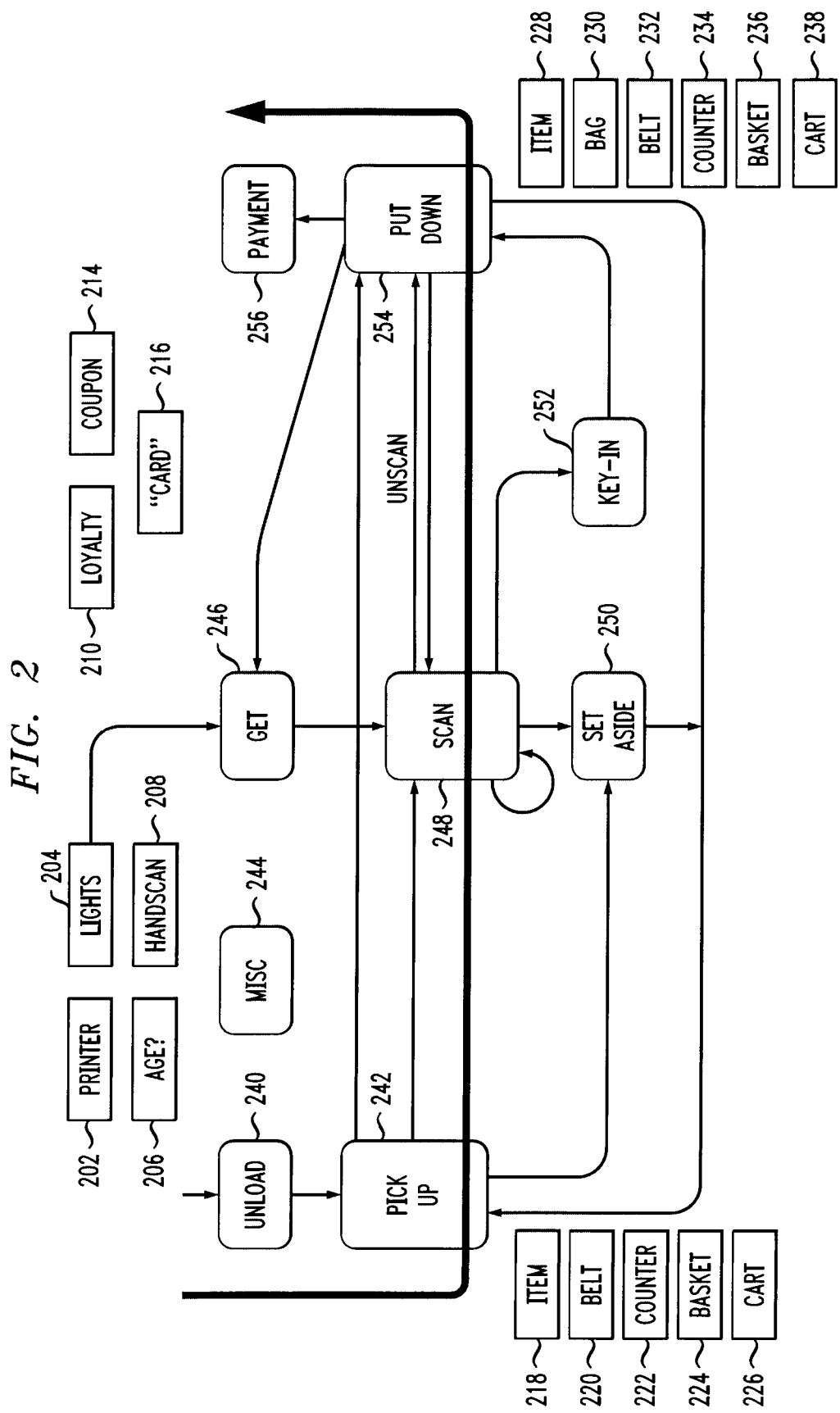
FIG. 2 is a diagram illustrating an exemplary retail checkout progression, according to an embodiment of the present invention.

FIG. 2 is a diagram illustrating an exemplary retail checkout progression, according to an embodiment of the present invention. By way of illustration, FIG. 2 depicts components such as a printer 202, lights 204, an age verification element 206, a hand-scan 208 and other miscellaneous elements 244 (for example, a hard-tag remover (often in apparel stores), a demagnetizer (high-end electronics stores), a radio-frequency identification (RFID) receiver, etc.). Also, at the beginning of the progression, a customer may unload in step 240 an item 218 onto a belt 220 or counter 222 from his or her basket 224 or cart 226, and a cashier or employee may pickup in step 242 the item 218 from the belt 220 or counter 222. The cashier or employee, at this stage, may also set aside an item in step 250.

Additionally, the cashier or employee, in step 246, may get a loyalty item 210, a coupon 214 and/or one or more types of cards 216 from the customer. The cashier or employee can also scan an item in step 248 and/or key-in information into the register in step 252. Further, in step 254, the cashier or employee can put down an item 228 onto a belt 232 or counter 234, and/or into a bag 230, a basket 236 and/or cart 238. Also, the cashier or employee can seek payment from the customer in step 256.

Figure 3:
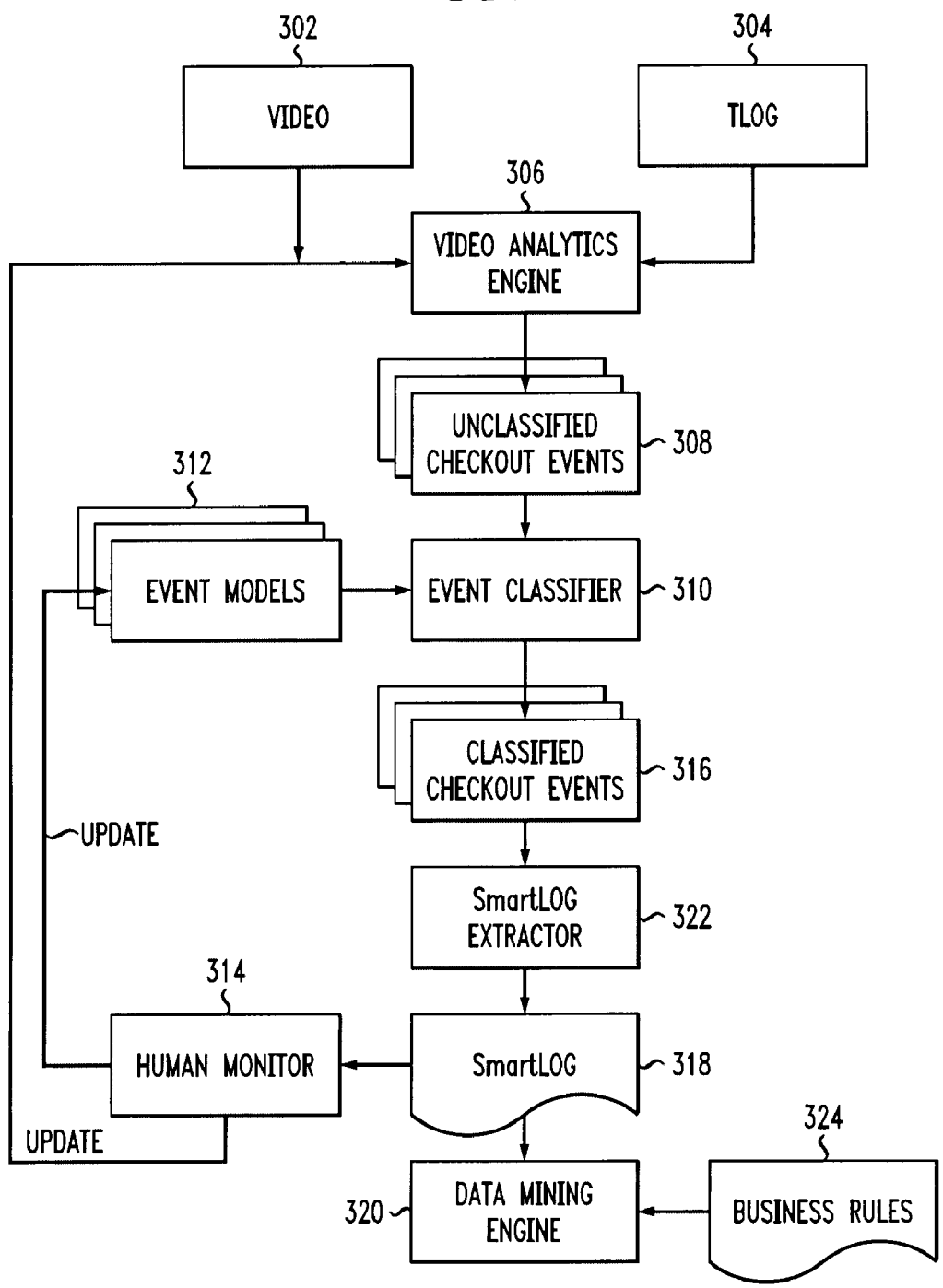
FIG. 3 is a diagram illustrating a system for using transactional and visual event information to facilitate loss prevention, according to an embodiment of the present invention.

FIG. 3 is a diagram illustrating a system for using transactional and visual event information to facilitate loss prevention, according to an embodiment of the present invention. By way of illustration, FIG. 3 depicts the elements of video 302, a transaction log (TLOG) 304, a video analytics engine 306, unclassified checkout events 308 and an event classifier 310. FIG. 3 also depicts the elements of event models 312, a human monitor 314, classified checkout events 316, a SmartLOG extractor 322, a SmartLOG 318, business or enterprise rules 324 and a data mining engine 320.

In one or more embodiments of the invention, based on the video 302 and TLOG 304 input, the video analytics engine 306 outputs a set of unclassified events 308 (each event is a collection of low-level features such as shape, color, texture, location, orientation, area, motion characteristics, edges, etc.). The event classifier 310 classifies the events based on its current set of event models 312 and outputs a set of classified checkout events 316 (for example, person present in cashier area, item scanned, item fake-scanned, multiple people present in customer area, transaction voided, etc.).

The SmartLog extractor 322 examines the classified events and collates them into a single "SmartLog" 318 which is a revised TLOG (for example, a superset of the TLOG), and can contain transactional and/or purely visual events. A human monitor 314 periodically examines the SmartLog and corrects misclassifications or non-optimal within-class ranking. As such, visual input can be included in the examination process. The corrections are propagated back to the event models 312 and video analytics engine 306. The SmartLog 318 along with business or enterprise rules 324 are input to a data mining engine 320 which finds patterns in the data (for example, fake scan, item void without customer present, manager override without manager, etc.).

Figure 4:
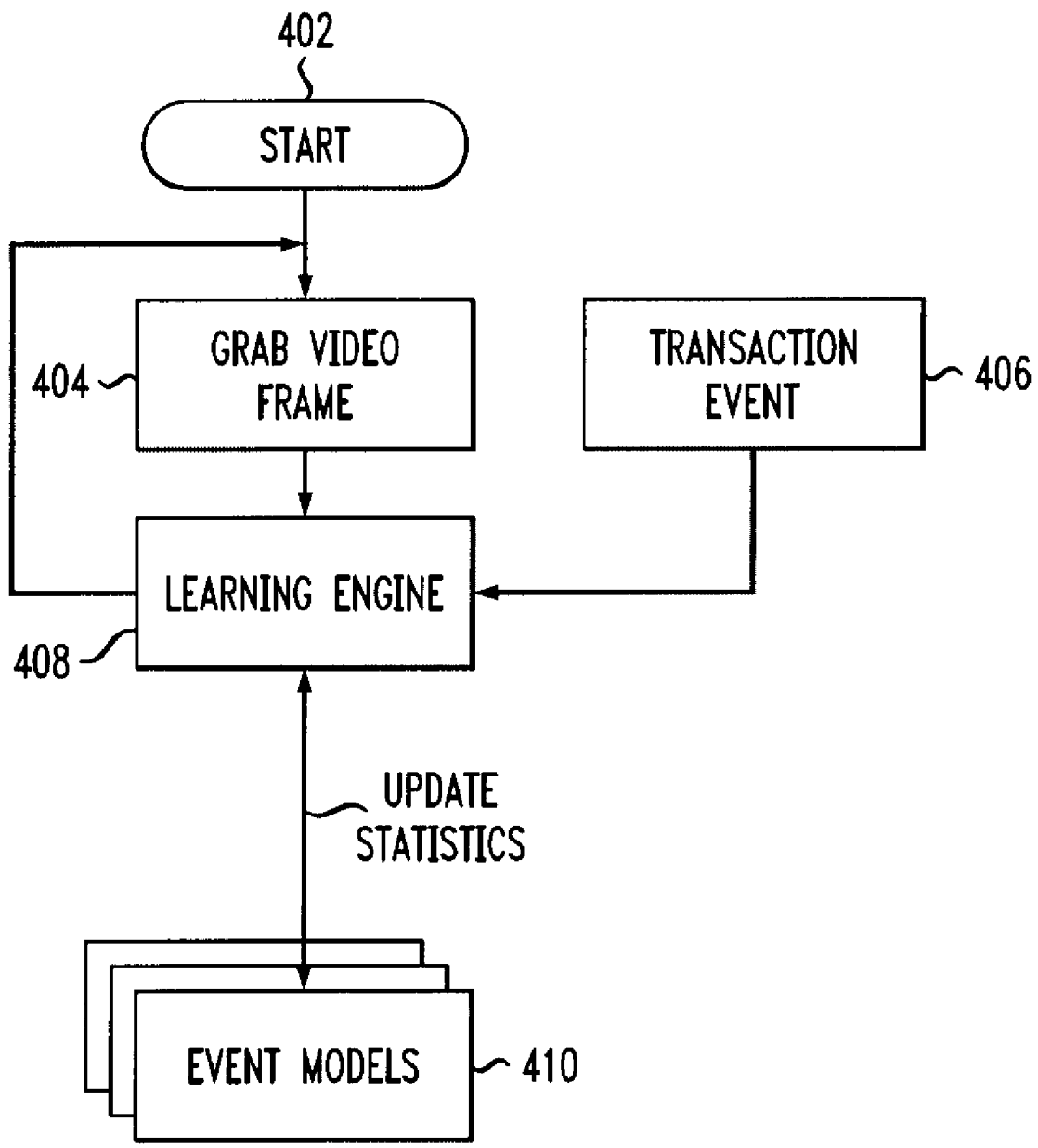
FIG. 4 is a diagram illustrating a statistical learning technique in the initialization phase, according to an embodiment of the present invention.

FIG. 4 is a diagram illustrating a statistical learning method in the initialization phase, according to an embodiment of the present invention. By way of illustration, FIG. 4 depicts starting in step 402, grabbing a video frame in step 404, importing a transaction event in step 406. Also, FIG. 4 depicts a learning engine 408 as well as event models 410. The learning engine 408 iteratively grabs video frames from a video source and receives transaction events as they are produced and updates the statistical event models 410. This process can proceed until such a time that the event models 410 are considered stable enough for use in the overall system. Note, also, that the learning phase can continue, by way of example, in conjunction with reinforcement learning with a human monitor involved.

Figure 5:
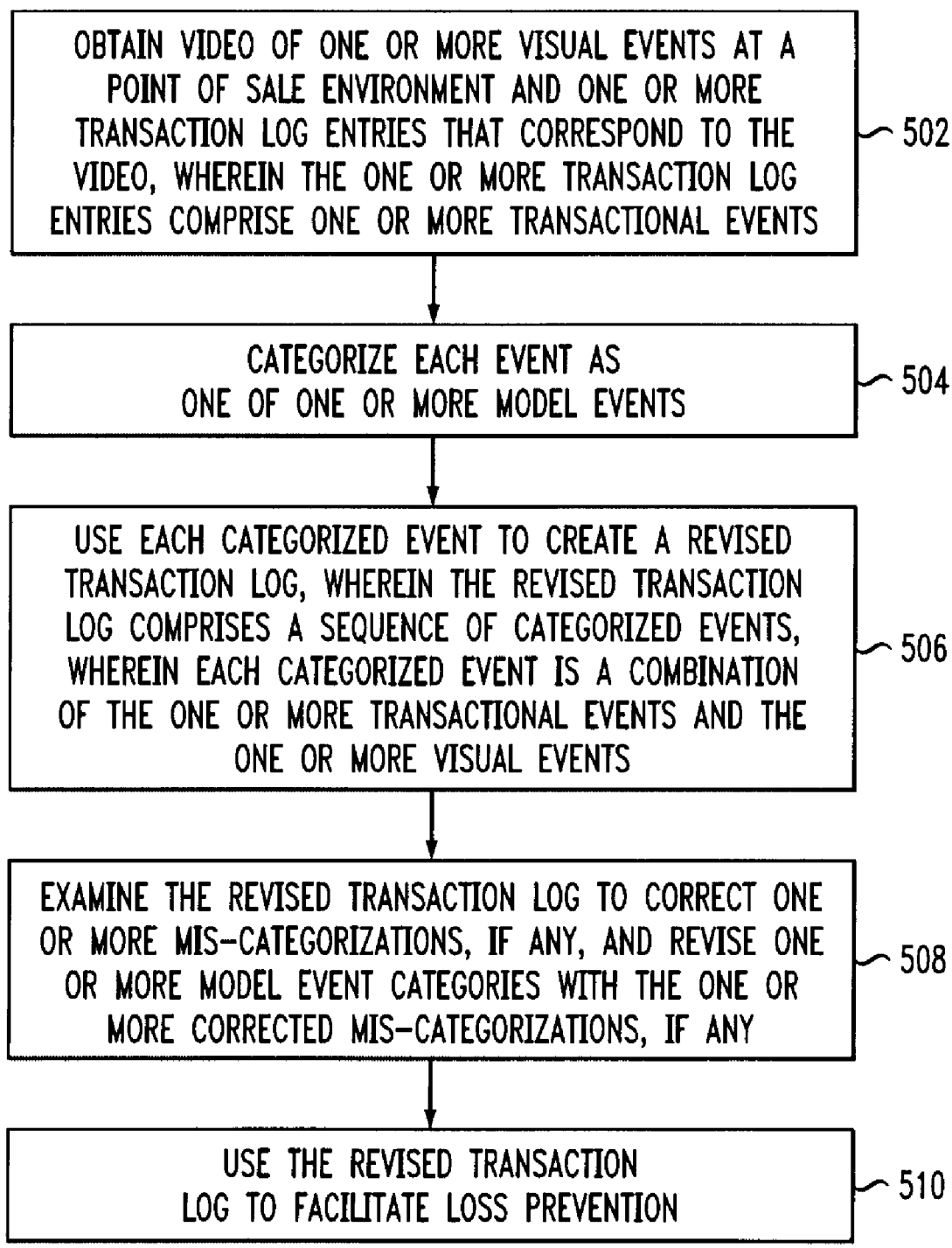
FIG. 5 is a flow diagram illustrating techniques for using transactional and visual event information to facilitate loss prevention, according to an embodiment of the present invention.

FIG. 5 is a flow diagram illustrating techniques for using transactional and visual event information to facilitate loss prevention, according to an embodiment of the present invention. Step 502 includes obtaining video of one or more visual events at a point of sale environment (for example, a checkout) and one or more transaction log (TLOG) entries that correspond to the video, wherein the one or more transaction log entries comprise one or more transactional events. Step 504 includes categorizing each event as one of one or more model events. The model events can include, for example, a person present in cashier area, a barcode scanned, multiple people present in customer area, a transaction voided, a person present in customer area, multiple people present in cashier area, a keyboard interaction, an item bagged, a pick-up motion, a scan motion and a drop motion, etc.

Step 506 includes using each categorized event to create a revised transaction log (also referred to herein as SmartLOG), wherein the revised transaction log includes a sequence of categorized events, wherein each categorized event is a combination of the one or more transactional events and the one or more visual events.

Step 508 includes examining the revised transaction log to correct one or more mis-categorizations, if any, and revise one or more model event categories with the one or more corrected mis-categorizations, if any. By way of example (and in reference to FIG. 3), the results of such a process can form the initial set of event models 312 that can be subsequently updated by the human monitor 314.

Step 510 includes using the revised TLOG to facilitate loss prevention. Using the revised TLOG to facilitate loss prevention can include finding one or more patterns (for example, a fake scan, an item void without a customer present, a manager override without manager, a refund without a customer present, a transaction void without a customer present, and a cash drawer opened between transactions, etc.) in the revised TLOG. The search patterns are patterns of interest. That is, patterns that are likely indicators of fraud, so they are used by the data mining engine to output possible fraud incidents.

The techniques depicted in FIG. 5 also include monitoring a retail checkout with a video camera and analyzing video of the point of sale environment to detect one or more point of sale events. Additionally, one or more embodiments of the invention include rating the categorization of each event based on a metric, as well as automatically learning statistical models of the model events (for example, for a user-determined time period following system initialization). In one or more embodiments of the invention, one can use any metric that measures the degree of similarity or dissimilarity of an unclassified event to event models. A metric can be used, for example, to classify the event as one of the model events or optionally placing the event into a reject category (not similar enough to any event models). Also, a metric can be used to classify within a class ranking of the event according to how well the event fits the model. Classification techniques to determine these similarities or dissimilarities can include, for example, nearest class mean, nearest neighbors, artificial neural nets, support vector machine, Bayesian classification, etc.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 6:
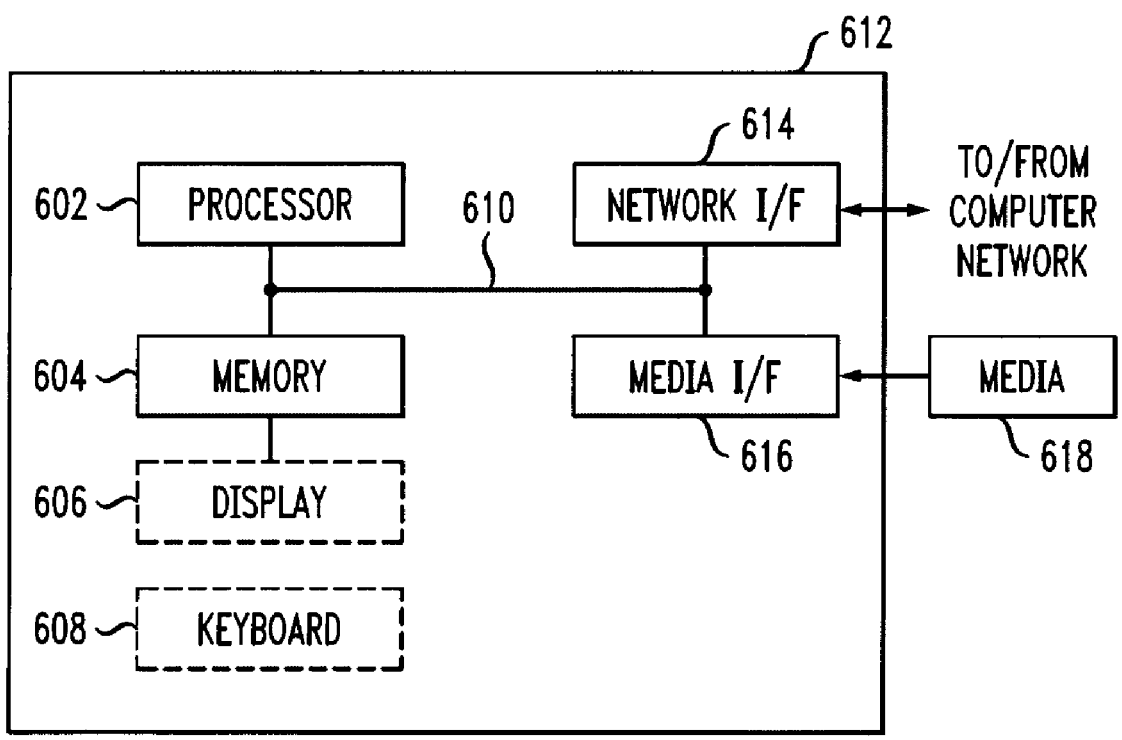
FIG. 6 is a system diagram of an exemplary computer system on which at least one embodiment of the present invention can be implemented.

At present, it is believed that the preferred implementation will make substantial use of software running on a general-purpose computer or workstation. With reference to FIG. 6, such an implementation might employ, for example, a processor 602, a memory 604, and an input and/or output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 602, memory 604, and input and/or output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 604), magnetic tape, a removable computer diskette (for example, media 618), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, using enhanced data mining, wherein visual information can provide an additional layer of content on top of TLOG entries.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for using transactional and visual event information to facilitate loss prevention, comprising the steps of:

obtaining video of one or more visual events at a point of sale environment and one or more transaction log entries that correspond to the video, wherein the one or more transaction log entries comprise one or more transactional events;

categorizing each event as one of one or more model events, wherein categorizing each event as one of one or more model events comprises using a metric to determine a degree of similarity of each event to the one or more model events;

using each categorized event to create a revised transaction log, wherein the revised transaction log comprises a sequence of categorized events, wherein each categorized event is a combination of the one or more transactional events and the one or more visual events;

examining the revised transaction log to correct one or more mis-categorizations, if any, and revise one or more model event categories with the one or more corrected mis-categorizations, if any; and using the revised transaction log to facilitate loss prevention.

2. The method of claim 1, further comprising automatically learning one or more statistical models of the one or more model events.

3. The method of claim 1, wherein using the revised transaction log to facilitate loss prevention comprises finding one or more patterns in the revised transaction log.

4. The method of claim 3, wherein the one or more patterns comprises at least one of a fake scan, an item void without a customer present, a manager override without manager, a refund without a customer present, a transaction void without a customer present, and a cash drawer opened between transactions.

5. The method of claim 1, wherein the one or more model events comprise at least one of a person present in cashier area, a barcode scanned, multiple people present in customer area, a transaction voided, a person present in customer area, multiple people present in cashier area, a keyboard interaction, an item bagged, a pick-up motion, a scan motion and a drop motion.

6. The method of claim 1, further comprising monitoring a retail checkout with a video camera.

7. The method of claim 1, further comprising analyzing video of the point of sale environment to detect one or more point of sale events.

8. The method of claim 1, further comprising rating the categorization of each event based on a metric.

9. A computer program product comprising a non-transitory computer readable medium having computer readable program code for using transactional and visual event information to facilitate loss prevention, said computer program product including:

computer readable program code for obtaining video of one or more visual events at a point of sale environment and one or more transaction log entries that correspond to the video, wherein the one or more transaction log entries comprise one or more transactional events;

computer readable program code for categorizing each event as one of one or more model events, wherein categorizing each event as one of one or more model events comprises using a metric to determine a degree of similarity of each event to the one or more model events;

computer readable program code for using each categorized event to create a revised transaction log, wherein the revised transaction log comprises a sequence of categorized events, wherein each categorized event is a combination of the one or more transactional events and the one or more visual events;

computer readable program code for examining the revised transaction log to correct one or more mis-categorizations, if any, and revise one or more model event categories with the one or more corrected mis-categorizations, if any; and computer readable program code for using the revised transaction log to facilitate loss prevention.

10. The computer program product of claim 9, further comprising computer readable program code for automatically learning one or more statistical models of the one or more model events.

11. The computer program product of claim 9, wherein the computer readable program code for using the revised transaction log to facilitate loss prevention comprises computer readable program code for finding one or more patterns in the revised transaction log.

12. The computer program product of claim 11, wherein the one or more patterns comprises at least one of a fake scan, an item void without a customer present, a manager override without manager, a refund without a customer present, a transaction void without a customer present, and a cash drawer opened between transactions.

13. The computer program product of claim 9, wherein the one or more model events comprise at least one of a person present in cashier area, a barcode scanned, multiple people present in customer area, a transaction voided, a person present in customer area, multiple people present in cashier area, a keyboard interaction, an item bagged, a pick-up motion, a scan motion and a drop motion.

14. The computer program product of claim 9, further comprising computer readable program code for analyzing video of the point of sale environment to detect one or more point of sale events.

15. The computer program product of claim 9, further comprising computer readable program code for rating the categorization of each event based on a metric.

16. A system for using transactional and visual event information to facilitate loss prevention, comprising:

a memory; and at least one processor coupled to said memory and operative to:

obtain video of one or more visual events at a point of sale environment and one or more transaction log entries that correspond to the video, wherein the one or more transaction log entries comprise one or more transactional events;

categorize each event as one of one or more model events, wherein categorizing each event as one of one or more model events comprises using a metric to determine a degree of similarity of each event to the one or more model events;

use each categorized event to create a revised transaction log, wherein the revised transaction log comprises a sequence of categorized events, wherein each categorized event is a combination of the one or more transactional events and the one or more visual events;

examine the revised transaction log to correct one or more mis-categorizations, if any, and revise one or more model event categories with the one or more corrected mis-categorizations, if any; and use the revised transaction log to facilitate loss prevention.

17. The system of claim 16, wherein the at least one processor coupled to said memory is further operative to automatically learn one or more statistical models of the one or more model events.

18. The system of claim 16, wherein in the using the revised transaction log to facilitate loss prevention, the at least one processor coupled to said memory is further operative to find one or more patterns in the revised transaction log.

19. The system of claim 18, wherein the one or more patterns comprises at least one of a fake scan, an item void without a customer present, a manager override without manager, a refund without a customer present, a transaction void without a customer present, and a cash drawer opened between transactions.

20. The system of claim 16, wherein the one or more model events comprise at least one of a person present in cashier area, a barcode scanned, multiple people present in customer area, a transaction voided, a person present in customer area, multiple people present in cashier area, a keyboard interaction, an item bagged, a pick-up motion, a scan motion and a drop motion.

21. The system of claim 16, wherein the at least one processor coupled to said memory is further operative to analyze video of the point of sale environment to detect one or more point of sale events.

22. The system of claim 16, wherein the at least one processor coupled to said memory is further operative to rate the categorization of each event based on a metric.

23. An apparatus for using transactional and visual event information to facilitate loss prevention, said apparatus comprising:
- means for obtaining video of one or more visual events at a point of sale environment and one or more transaction log entries that correspond to the video, wherein the one or more transaction log entries comprise one or more transactional events;
- means for categorizing each event as one of one or more model events, wherein categorizing each event as one of one or more model events comprises using a metric to determine a degree of similarity of each event to the one or more model events;
- means for using each categorized event to create a revised transaction log, wherein the revised transaction log comprises a sequence of categorized events, wherein each categorized event is a combination of the one or more transactional events and the one or more visual events;
- means for examining the revised transaction log to correct one or more mis-categorizations, if any, and revise one or more model event categories with the one or more corrected mis-categorizations, if any; and
- means for using the revised transaction log to facilitate loss prevention.

* * * * *